United States Patent
Abrass et al.

(10) Patent No.: US 12,218,492 B2
(45) Date of Patent: Feb. 4, 2025

(54) ARRANGEMENT FOR THE ASSEMBLY AND WIRING OF ELECTRICAL COMPONENTS IN SWITCHGEAR CONSTRUCTION AND A CORRESPONDING METHOD

(71) Applicant: RITTAL GMBH & CO. KG, Herborn (DE)

(72) Inventors: Ahmad Abrass, Waldbrunn (DE); Andreas Michael Baechler, Haiger (DE)

(73) Assignee: RITTAL GMBH & CO. KG, Herborn (DE)

( * ) Notice: Subject to any disclaimer, the term of this patent is extended or adjusted under 35 U.S.C. 154(b) by 343 days.

(21) Appl. No.: 17/801,374

(22) PCT Filed: Dec. 14, 2020

(86) PCT No.: PCT/DE2020/101058
§ 371 (c)(1),
(2) Date: Aug. 22, 2022

(87) PCT Pub. No.: WO2021/170163
PCT Pub. Date: Sep. 2, 2021

(65) Prior Publication Data
US 2023/0101717 A1      Mar. 30, 2023

(30) Foreign Application Priority Data
Feb. 28, 2020   (DE) .................. 10 2020 105317.7

(51) Int. Cl.
*H02G 1/06*     (2006.01)
*B25J 9/16*     (2006.01)
(Continued)

(52) U.S. Cl.
CPC .............. *H02B 3/00* (2013.01); *B25J 9/1687* (2013.01); *B25J 9/1697* (2013.01); *B25J 13/08* (2013.01);
(Continued)

(58) Field of Classification Search
CPC ........ B25J 9/1687; B25J 9/1697; B25J 13/08; H02B 3/00; H02G 1/06; G06T 7/73
See application file for complete search history.

(56) References Cited

U.S. PATENT DOCUMENTS 6,079,097 A      6/2000  Henrici et al.
6,396,281 B1 *   5/2002  Mitsuda ................ G01R 31/59
                                                          324/503
(Continued)

FOREIGN PATENT DOCUMENTS

DE            4431254 A1     3/1996
DE       102019106710 A1     9/2020
(Continued)

OTHER PUBLICATIONS

International Search Report (English and German) and Written Opinion of the ISA (German) issued in PCT/DE2020/101058, mailed Apr. 23, 2021; ISA/EP.

(Continued)

*Primary Examiner* — Dalena Tran
(74) *Attorney, Agent, or Firm* — Harness, Dickey & Pierce, P.L.C.

(57) ABSTRACT

An arrangement for the assembly and wiring of electrical components in switchgear construction, the arrangement comprising a robot with an end effector designed as a gripper, a mounting plate holding device, with which a mounting plate is held in a mounting position with respect to the robot, and a component supply in the access area of the robot, via which components to be mounted on the (Continued)

Figure 1:
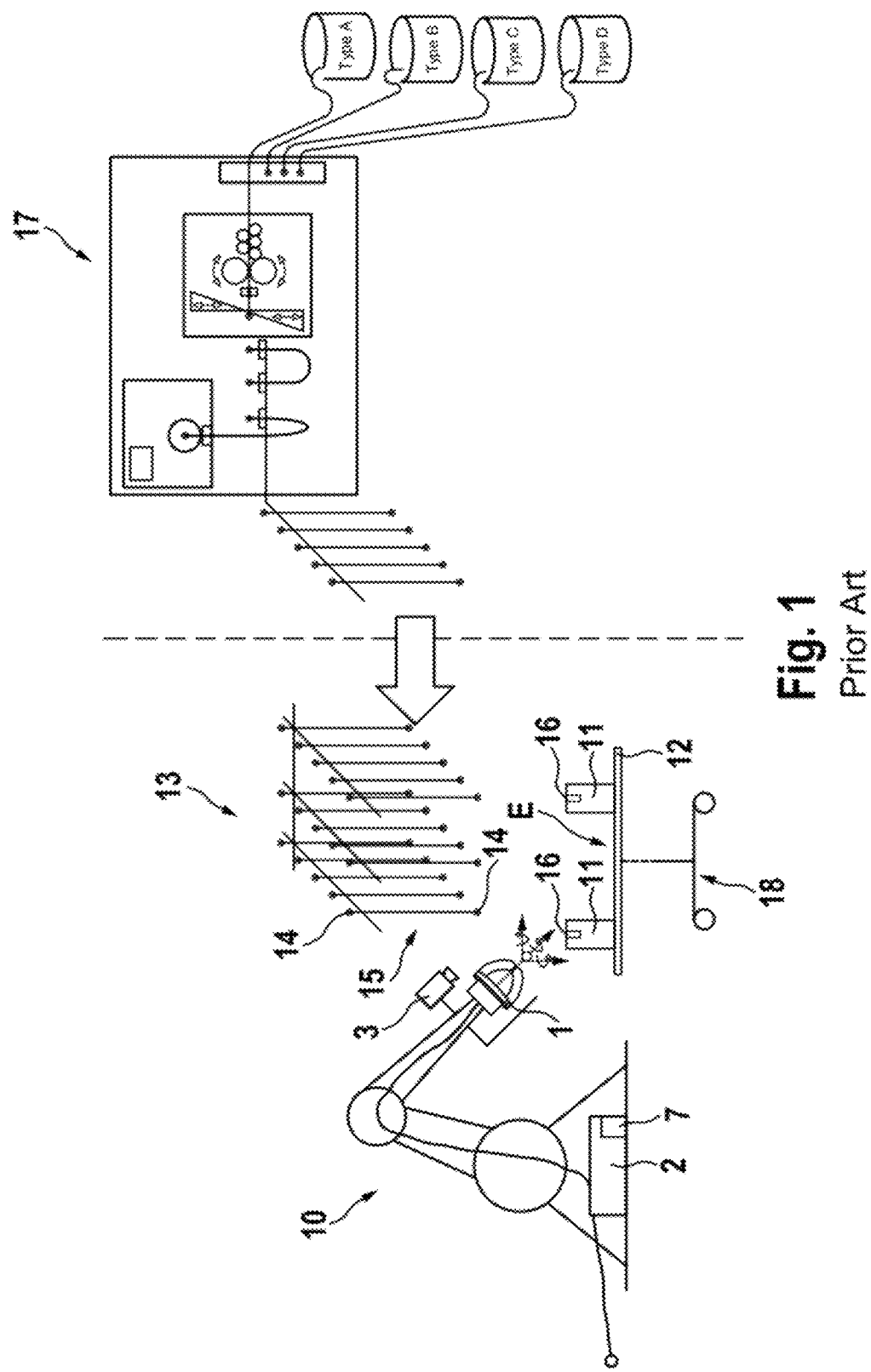

mounting plate are provided for removal by the robot, wherein a controller of the robot has machine data for controlling the robot including position data for the arrangement of components on a mounting plane of a mounting plate to be equipped, wherein the robot has an optical imaging system which is adapted to detect an orientation of a mounting plate with respect to the robot, the controller of the robot being adapted to provide the position data with an offset representing the orientation of the mounting plate with respect to the robot as a function of the detected orientation. A corresponding method is further described.

12 Claims, 2 Drawing Sheets

(51) Int. Cl.
*B25J 13/08* (2006.01)
*G06T 7/73* (2017.01)
*H02B 3/00* (2006.01)
*B25J 15/00* (2006.01)

(52) U.S. Cl.
CPC ............... *G06T 7/73* (2017.01); *H02G 1/06* (2013.01); *B25J 15/0028* (2013.01); *G06T 2207/10012* (2013.01); *G06T 2207/30164* (2013.01)

(56) References Cited

U.S. PATENT DOCUMENTS

| | | | | |
|---|---|---|---|---|
| 7,441,327 | B2 * | 10/2008 | Furuya | H01R 43/20 29/748 |
| 7,774,927 | B2 * | 8/2010 | Karrasch | H01R 43/28 29/748 |
| 9,186,760 | B2 * | 11/2015 | Rudduck | B23P 19/04 |
| 9,385,498 | B2 * | 7/2016 | Satake | H01R 43/048 |
| 10,373,742 | B2 * | 8/2019 | Shimizu | B25H 1/14 |
| 2006/0033713 | A1 | 2/2006 | Pryor | |
| 2014/0277732 | A1 | 9/2014 | Shiota et al. | |
| 2015/0158176 | A1 | 6/2015 | Fujita et al. | |
| 2017/0320213 | A1 | 11/2017 | Helmick et al. | |
| 2018/0108458 | A1 | 4/2018 | Maki et al. | |
| 2020/0016759 | A1 | 1/2020 | Kim et al. | |

FOREIGN PATENT DOCUMENTS

| | | |
|---|---|---|
| EP | 0924818 A2 | 6/1999 |
| WO | WO-2019146007 A1 | 8/2019 |

OTHER PUBLICATIONS

German International Preliminary Report on Patentability issued in PCT/DE2020/101058, mailed Jun. 13, 2022; ISA/EP.

* cited by examiner

ARRANGEMENT FOR THE ASSEMBLY AND WIRING OF ELECTRICAL COMPONENTS IN SWITCHGEAR CONSTRUCTION AND A CORRESPONDING METHOD

CROSS-REFERENCE TO RELATED APPLICATIONS

This application is a U.S. National Phase Application under 35 U.S.C. 371 of International Application No. PCT/DE2020/101058, filed on Dec. 14, 2020, which claims the benefit of German Patent Application No. 10 2020 105317.7, filed on Feb. 28, 2020. The entire disclosures of the above applications are incorporated herein by reference.

BACKGROUND

This section provides background information related to the present disclosure which is not necessarily prior art.

TECHNICAL FIELD

The invention relates to an arrangement for mounting and wiring electrical components in switchgear construction, the arrangement comprising a robot with an end effector designed as a gripper, a mounting plate holding device by means of which a mounting plate is held in a mounting position with respect to the robot and a component supply in the access area of the robot, via which components to be mounted on the mounting plate are provided for removal by the robot, wherein a controller of the robot has machine data for controlling the robot including position data for the arrangement of components on a mounting plane of a mounting plate to be equipped. Such an arrangement is known from US 2014/0277732 A1, from EP 0 924 818 A2 and from DE 44 31 254 A1.

DISCUSSION

The arrangements known from the prior art have the disadvantage that the mounting plate in particular must be arranged with high precision in relation to the robot, which can be designed as an articulated arm robot, for example, with error tolerances that are in the submillimeter range in order to enable reliable arrangement of the components and the wiring of these with wiring components such as cables and the like. Despite all calibration efforts to arrange the mounting plate with high precision in relation to the robot, there is still the problem with process steps that are carried out by the robot and require the highest precision, such as feeding a cable end, for example a ferrule to a contact point of a component, that readjustment is frequently required or that such steps can only be implemented by manual intervention. Particularly for these manually complex processing steps in the creation of electrical switchgear, there is a correspondingly high need to be able to perform them automatically as well.

SUMMARY

This section provides a general summary of the disclosure, and is not a comprehensive disclosure of its full scope or all of its features.

It is therefore one aspect of the invention to further develop an arrangement of the type described above in such a way that it further allows to automate the execution of processing steps requiring high precision when creating an electrical switchgear on a mounting plate.

Accordingly, in one arrangement, the robot is provided with an optical imaging system configured to detect an orientation of a mounting plate with respect to the robot, wherein the controller of the robot is configured to provide the position data with an offset representing the orientation of the mounting plate with respect to the robot depending on the detected orientation.

It can be provided that an alignment of the mounting plate with respect to the robot is detected with the optical imaging system, which has, for example, an imaging camera or the like. At the same time or alternatively, a deviation of the actual arrangement of the mounting plate with respect to a reference orientation of the mounting plate can be detected. The respective detected deviation can then be used to calculate an offset which is applied to the position data for the arrangement of the components in further processing steps.

The idea of the invention is thus based on the fact that, instead of attempting to arrange the mounting plate with high precision with respect to the robot, a largely arbitrary arrangement of the mounting plate or a certain deviation of the arrangement of the mounting plate from a desired arrangement of the mounting plate is permitted, this arrangement of the mounting plate is detected, an offset is calculated from the detected arrangement or a deviation, and this offset is taken into account in the further processing of the mounting plate to the extent that the offset is applied to the position data of the components or the processing steps.

The machine data for controlling the robot can be derived by the controller directly from 3D CAD data of a computer-aided system for engineering an electrical switchgear. This 3D CAD data can, for example, have an electrical circuit diagram, a drill hole pattern for machining the mounting plate, a wiring diagram and the like. For example, the data may have a layout according to which components are to be arranged on the mounting plane, cables/wires are to be routed on the mounting plane, and knockouts are to be made in the mounting plate. Since these 3D CAD data are initially generated independently of the machining system with the aid of which the planned switchgear is to be generated on the mounting panel, the 3D CAD data do not have any machine data for controlling the robot and likewise consequently also no nominal position of the machining robot in relation to the mounting panel.

The optical imaging system is not limited to any particular imaging systems. Advantageously, however, the imaging system has a camera system, preferably a stereo camera with two individual cameras arranged at an angle, preferably at an acute angle to one another, which generate a three-dimensional imaging area in the intersection of their image planes. The imaging area can be located, for example, in the region of the distal end of the gripper of the end effector in order to capture a precise image of, for example, a component fixed in the gripper and its exact orientation with respect to the gripper. The optical imaging system may have a stereo camera with both optical axes arranged at an acute angle to the gripper.

The gripper can have two gripper fingers aligned parallel to each other and adjustable perpendicular to each other, with the two optical axes and the two longitudinal axes of the two gripper fingers lying in the same plane or in two parallel planes. A suitable gripper is described, for example, in DE 10 2019 106 710 A1. The gripper is characterized precisely by the fact that the two gripper fingers are arranged parallel to one another and are adjustable perpendicular to one another. For this purpose, the two gripper fingers can be adjusted relative to each other via a linear adjustment unit.

For determining the orientation of the mounting plate with respect to the robot, the optical imaging system can be adapted to record a 2- or 3-dimensional image of the mounting plane of the mounting plate, which has a borehole image, and to transfer the recorded borehole image by means of a transformation, preferably a coordinate transformation, into a reference borehole image of the mounting plate stored in the machine data, the offset being determined by the transformation.

The optical imaging system can have a component recognition system that is adapted to identify a component provided at the component feeder or mounted on the mounting plate based on its geometric dimensions recorded with the optical imaging system and by matching these with reference dimensions stored in a memory of the controller that are associated with a specific component or type of component.

The component recognition can be adapted to obtain physical component data relating to a recognized component from a database and to determine position data for at least one contact point of the component relating to the physical component data from the component data. The physical component data obtained by the component recognition may also be limited to said contacting points, so that no data extraction work is to be performed by the component recognition.

The controller can be adapted to compare the position data of the at least one contacting point with target specifications stored in the machine data for the position data of the at least one contacting point and, if a deviation is determined, to provide the machine data with an offset that compensates for the deviation.

A distal gripper end may be located within the imaging area of the optical imaging system, wherein the optical imaging system is adapted to determine an orientation of a cable end, preferably a ferrule of the cable end, with respect to the gripper.

The controller can be further configured to determine a feed direction of the cable end to a contacting point of a component to be wired, knowing the orientation of the cable end with respect to the gripper, and to control the robot to feed the cable end along the feed direction to the contacting point.

The optical imaging system may be arranged to detect a gap between two adjacent fingers of the side walls of a cable duct and to output position data representing the gap to the controller, which is arranged to control the robot so that it uses its gripper to insert a cable wired to a component on at least one side into the gap.

The robot can also be adapted to lay a component in the form of a cable along a laying path from a first component to a second component to be wired to the first component, the optical imaging system being adapted to detect a possible obstacle along the laying path and, if an obstacle is detected, to output corresponding information to the controller, which is adapted to control the gripper to execute a compensating movement that avoids a collision with the obstacle.

For detecting the orientation of the mounting plate with respect to the robot, the optical imaging system may be configured to detect features, such as holes, such as mounting holes for component mounting on the mounting plate, on the mounting plane and/or at least one edge of the mounting plate.

The controller can be adapted to apply the offset to machine data for inserting a hole pattern into the mounting plate and to control the robot to insert the hole pattern into the mounting plate in accordance with the machine data applied with the offset. To do this, the robot can use its end effector, which is designed as a gripper, to pick up a corresponding tool from a tool pickup point and guide it over the mounting plane of the mounting plate for machining the mounting plate. Here again, the optical imaging system can be used to detect the exact arrangement of the tool selected by the robot at the tool pickup point in order to achieve precise removal of the tool and thus precise machining of the mounting plate by the robot.

According to another aspect, a method for operating an arrangement of the type previously described is proposed, comprising the steps of:

guiding a mounting plate to a robot for processing the mounting plate directed towards the creation of an electrical switchgear, wherein the robot is controlled by machine data comprising position data for the arrangement of components on a mounting plane of the mounting plate;

Detecting an orientation of the mounting plate with respect to the robot with the optical imaging system; and Depending on the detected orientation, providing the position data with an offset representing the orientation of the mounting plate with respect to the robot.

The method may further comprise:

Determining an orientation of a cable end, preferably a ferrule of the cable end with respect to a gripper of the robot;

Determining a feed direction of the cable end to a contacting point of a component to be wired, knowing the orientation of the cable end with respect to the gripper; and Control the robot to feed the cable end along the feed direction to the contacting point and, if necessary, to insert it into the contacting point.

A device and a method for automated processing of electrical components in switchgear construction are thus described, whereby automated detection of holes, objects and contact points on mounting plates is made possible with the aid of an optical imaging system. In particular, this automates the processing of the mounting plate (drilling holes, cutting threads, milling cutouts), the equipping and fastening of components on the mounting plate (equipping and fastening mounting rails, cable ducts, with screws or rivets), the wiring (taking up wires, handling and contacting as well as laying these) as well as the testing of installed components (connection testing, measurement, etc.) to an extent that has not been feasible with the arrangements known from the prior art.

Individual elements and components, such as drill holes, electrical components, cable ducts, mounting rails or wires, can be geometrically recorded and/or their location coordinates can be automatically analyzed and compared with existing 3D CAD data, for example, so that the process can be adapted by creating an offset if necessary, thus achieving a high degree of automation.

Preferably, a stereo camera is used for the aforementioned detection, which has at least two image capture sensors or single image cameras that are aligned relative to each other to an overlapping detection area. The stereo camera system can be mounted on a flange of a robot, for example on the end effector of a jointed-arm robot, and can be aligned both to the tip of the end effector, for example to the gripper fingers, and to the background of the fingers with a detection area of, for example, 120×120 mm. For the realization of the stereo camera, mono cameras can be used, which are aligned to each other via a mounting frame and integrated into the overall unit of the end effector, for example by attaching the mono cameras laterally to the multifunctional gripper.

To evaluate the captured images, the stereo camera system can be signal-technically coupled with an external evaluation unit, which implements the evaluation of the images in real time (on-line). Alternatively, the evaluation can be implemented locally via the control system of the arrangement. The evaluation unit or the control system can have an evaluation algorithm for image processing, for example an evaluation algorithm for automatic detection and preferably also identification of objects and contact points in the detection area.

In the state of the art, the value-added process of switchgear and control system construction essentially features the following workstations:
  in a 1st step, the mounting plate is removed from the control cabinet housing in the incoming goods department and separated for further processing;
  in a 2nd step the processing of the mounting plate takes place;
  in a 3rd step, the mounting rails and cable ducts are provided assembled or pre-assembled;
  in a 4th step, the mounting rails and cable ducts are mounted on the mounting plate;
  in a 5th step, the mounting rails are equipped with electrical components;
  in a 6th step the wiring of the electrical components takes place;
  in a final step, the mounting plate is reinstalled in the control cabinet housing and, if necessary, a check of the switchgear is carried out, for example an electrical contact test.

Insofar as the aforementioned process steps, in particular machining, assembly, wiring and testing, are to be carried out fully automatically, it may be necessary for the initial position to be recorded before the respective process step, in particular for the coordinates and position data of the components found, in particular the mounting plate, to be recorded.

This means that for processing the mounting plate, the mounting plate can be referenced or its position and orientation can be determined in relation to the robot. This can preferably be done by detecting fastening holes on the mounting plate and/or via edge detection of the mounting plate.

For the process step of equipping the mounting plate with components, the detection of the initial position can have, on the one hand, the provided components such as mounting rail, cable ducts, fasteners and fastening tools, electrical components and the like being detected at their provision location and, on the other hand, the mounting plate being referenced (if necessary once more) with respect to the robot. In this way, the exact position and orientation of the mounting plate can be determined and, if necessary, the positions for holes and cutouts to be made in the mounting plate can be derived from this.

For the wiring process step, the initial position detection may have at least one of the following steps:
  Referencing the mounting plate, in particular to determine the orientation and position of the mounting plate in relation to the robot;
  Determining the position data and, if necessary, alignment of the assemblies already fitted on the mounting plate on the basis of physical features of the components, which can be performed, for example, as part of 2D or 3D object matching;
  Determining the contacting points from the known position data of the components assembled on the mounting plate;
  In order to start the wiring process, the orientation of the ferrule between the gripper fingers can be determined in a further step, a subsequent correction by the robot can be implemented if necessary, and the first wire end can be contacted in a subsequent step.

After contacting the first wire end, the gaps between neighboring cable duct fingers are detected in the further course of the process for pressing down/fixing the wire in the cable duct and the wire is specifically placed there or pressed down into the gap between the cable fingers.

Furthermore, along the further laying process, any obstacles such as wire loops along the laying path can be detected and a compensating movement performed by the robot.

For contacting the second wire end, the orientation of the ferrule between the gripper fingers can be determined in the same way as for the first wire end, a subsequent correction can be implemented by the robot if necessary, and the second wire end can be contacted in a subsequent step.

The data required for the evaluation algorithm can be provided directly from a 3D ECAD system in the form of a text file and, if necessary, an associated 3D CAD file.

The movements that may be required for the recordings with the optical imaging system are preferably implemented with the aid of an articulated arm robot. As far as possible, these images are preferably integrated into the motion sequences and individual steps of the processes to be carried out and described above (machining of the mounting plate, equipping of the mounting plate and fastening of the components on the mounting plate, wiring, testing of the switchgear, . . . ) and thus do not require any additional motion sequences.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Figure 2:
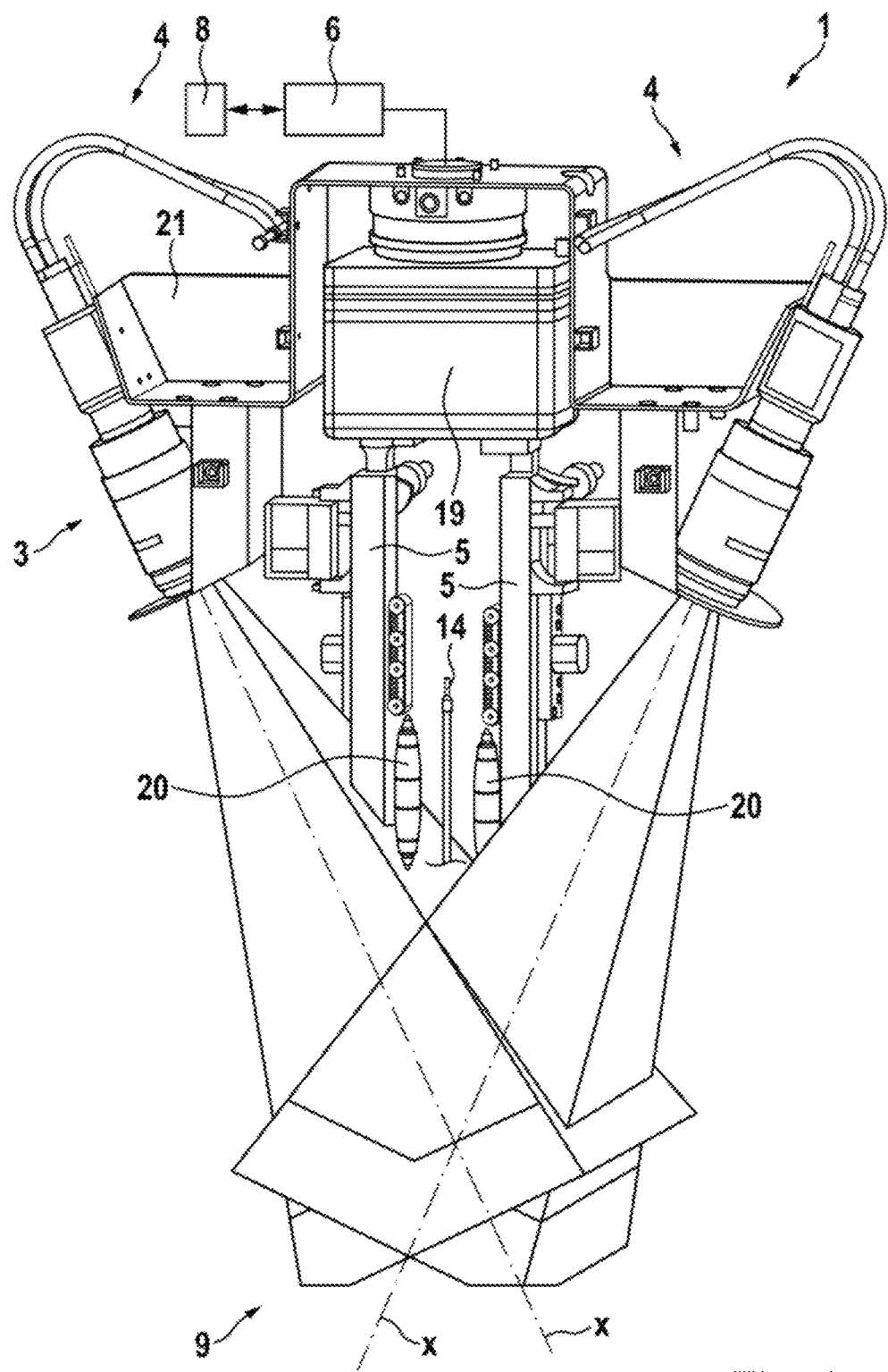

Further details of the inventions explained with reference to the figures below. Thereby shows:
  FIG. 1 an arrangement according to the state of the art;
  FIG. 2 an exemplary embodiment of a gripper.

DETAILED DESCRIPTION

Example embodiments will now be described more fully with reference to the accompanying drawings.

FIG. 1 shows an arrangement known from the prior art for the assembly and wiring of electrical components 11 of an electrical switchgear to be formed on a mounting plate 12. The mounting plate 12 is held horizontally by a transport carriage 18 so that the components 11 can be accessed from above by an articulated-arm robot 10 with a gripper 1 for the purpose of cable feed, contacting and, if necessary, quality assurance. The gripper 1 is located in the field of view of an optical imaging system 3, which is designed as a monocamera.

The jointed-arm robot 10, or its gripper 1, can be used to pick up preassembled cables 15 from a transfer interface 13 and feed them to the components 11 for contacting. The pre-assembled cables 15 can be produced with the aid of an automatic cable assembly machine 17, as is known in principle from the prior art.

For wiring, the robot 10 can use its gripper 1 to remove a first of the preassembled cables 15 from the interface 13 by gripping the cable 15 at one of its opposing preassembled cable ends 14. The cable end 14 may, for example, have a ferrule. Thereupon, the cable end 14 is fed to a first contacting point 16 of a first electrical component 11 and makes contact therewith. After the first cable end 14 has been contacted at the 1st contacting point 16, the cable 15 is routed from the 1st contacting point 16 to the second contacting point 16 of a second electrical component 11 of the electrical switchgear and the second cable end 14 is contacted at the second electrical contacting point 16.

The problem here is that the cable 15 is a flexible component which must be maneuvered during the contacting process and the laying of the cable 15 in such a way that the cable 15 does not become entangled with the electrical components 11 of the electrical switchgear or other superstructures on the mounting plate 12. In order to achieve a high level of process reliability, it is therefore necessary to guide the cable 15 precisely throughout the entire process sequence, from the removal of the cable 15 from the interface 13 to the contacting of the second cable end 14 at the second contacting point 16 of the second component 11.

To solve this problem, a gripper 1 can be used, as shown by way of example in FIG. 2. The gripper 1 has a first and a second gripper finger 5, which can be adjusted exclusively linearly relative to one another by means of a linear adjustment unit 19 in such a way that they vary their distance relative to one another perpendicular to their longitudinal direction. A receiving area is formed between the gripper fingers 5, which is delimited by complementary gripper jaws 20 on opposite sides of the gripper fingers 5. Further details of the kinematics of the gripper 1 are described in DE 10 2019 106 710 A1.

According to the invention, the gripper 1 now has an optical imaging system 3 which is adapted to detect an orientation of the mounting plate 12 (see FIG. 1) with respect to the robot 10, the controller 2 of the robot 10 being set up, depending on the detected orientation, to provide the position data for the arrangement of components 11, 15 on the mounting plane of the mounting plate 12 with an offset representing the orientation of the mounting plate 12 with respect to the robot 10.

The optical imaging system 3 is designed as a stereo camera 4 consisting of two monocameras whose two optical axes x are arranged at an acute angle to the gripper 1 and to each other. The monocameras can be cameras known from the prior art, which are aligned to each other via a mounting frame 21. The monocameras are arranged laterally in the alignment of the multifunctional gripper 1.

The two optical axes x and the two longitudinal axes of the two gripper fingers 5 of the gripper 1 are arranged in the same plane or in two parallel planes.

The optical imaging system 3 has a component recognition system 6 which is adapted to identify a component 11, 15 provided at the component supply 13 or mounted on the mounting plate 12 on the basis of its geometric dimensions recorded with the optical imaging system 3 and by matching these with reference dimensions stored in a memory 7 of the controller 2 which are assigned to a specific component 11, 15 or a specific component type. In this context, the component recognition system 6 can be adapted to obtain physical component data relating to a recognized component 11, 15 from a database 8 and to determine position data for at least one contact point 16 of the component 11, 15 relating to the physical component data from the component data.

The features of the invention disclosed in the foregoing description, in the drawings as well as in the claims may be essential to the realization of the invention both individually and in any combination.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

The invention claimed is:

1. An arrangement for mounting and wiring electrical components in switchgear construction, the arrangement comprising a robot with an end effector designed as a gripper, a mounting plate holding device, with which a mounting plate is held in a mounting position with respect to the robot, and a component supply in the access area of the robot, via which components to be mounted on the mounting plate are provided for removal by the robot, wherein a controller of the robot has machine data for controlling the robot including position data for the arrangement of components on a mounting plane of a mounting plate to be equipped, wherein the robot has an optical imaging system which is adapted to detect an orientation of a mounting plate with respect to the robot, the controller of the robot being adapted to provide, as a function of the detected orientation, the position data with an offset representing the orientation of the mounting plate with respect to the robot, wherein the optical imaging system comprises a stereo camera whose two optical axes are arranged at an acute angle to the gripper, wherein a distal gripper end is located in the imaging area of the optical imaging system, wherein the optical imaging system is arranged to determine an orientation of a cable end, preferably a ferrule of the cable end, with respect to the gripper.

2. The arrangement according to claim 1, in which the gripper has two gripper fingers which are aligned parallel to one another and can be adjusted perpendicular to one another, the two optical axes and the two longitudinal axes of the two gripper fingers lying in the same plane or in two parallel planes.

3. The arrangement according to claim 1, in which the optical imaging system for determining the orientation of the mounting plate with respect to the robot is adapted to record a 2- or 3-dimensional image of the mounting plane of the mounting plate, which mounting plane has a borehole image, and to convert the recorded borehole image by means of a transformation, preferably a coordinate transformation, into a reference borehole image of the mounting plate, which reference borehole image is stored in the machine data, the offset being determined by the transformation.

4. The arrangement according to claim 1, in which the optical imaging system has a component recognition system which is adapted to identify a component provided at the component supply or mounted on the mounting plate on the basis of its geometric dimension recorded with the optical imaging system and by matching this with reference dimensions which are stored in a memory of the controller and are assigned to a specific component or a specific component type.

5. The arrangement according to claim 4, in which the component recognition system is arranged to obtain, for a recognized component, physical component data relating to the recognized component from a database and to determine from the component data position data for at least one contacting point of the component relating to the physical component data.

6. The arrangement according to claim 5, in which the controller is adapted to compare the position data of the at least one contacting point with setpoint specifications stored in the machine data for the position data of the at least one contacting point and, if a deviation is determined, to provide the machine data with an offset compensating for the deviation.

7. The arrangement according to claim 1, wherein the controller is arranged to determine a feed direction of the cable end to a contacting point of a component to be wired, having regard to the orientation of the cable end with respect to the gripper, and to control the robot to feed the cable end along the feed direction to the contacting point.

8. The arrangement according to claim 1, in which the optical imaging system is arranged to detect a gap between two adjacent fingers of the side walls of a cable duct and to output position data representing the gap to the controller, which is arranged to control the robot such that it uses its gripper to insert a cable wired at least on one side to a component into the gap.

9. The arrangement according to claim 1, in which the robot is adapted to lay a component in the form of a cable along a laying path from a first component to a second component to be wired to the first component, the optical imaging system being adapted to detect a possible obstacle along the laying path and, in the event of a detected obstacle, to output corresponding information to the controller, which is adapted to control the gripper or the robot to execute a compensating movement that avoids a collision with the obstacle.

10. The arrangement according to claim 1, wherein the optical imaging system for detecting the orientation of the mounting plate with respect to the robot is adapted to detect features, preferably holes such as mounting holes, on the mounting plane and/or at least one edge of the mounting plate.

11. The arrangement according to claim 1, wherein the controller is arranged to apply the offset to machine data for inserting a borehole pattern into the mounting plate and to control the robot to insert the borehole pattern into the mounting plate according to the machine data applied with the offset.

12. A method of operating an arrangement according to claim 1, the method comprising:
  Feeding a mounting plate to a robot for the processing of the mounting plate directed towards the creation of an electrical switchgear, wherein the robot is controlled via machine data comprising position data for the arrangement of components on a mounting plane of the mounting plate;
  Detecting an orientation of the mounting plate with respect to the robot with the optical imaging system;
  Depending on the detected orientation, providing the position data with an offset representing the orientation of the mounting plate with respect to the robot;
  Determining an orientation of a cable end, preferably a ferrule of the cable end, with respect to a gripper of the robot;
  Determining a feed direction of the cable end to a contacting point of a component to be wired, knowing the orientation of the cable end with respect to the gripper; and
  Controlling the robot to feed the cable end along the feed direction to the contacting point.

\* \* \* \* \*